United States Patent
Schein et al.

(10) Patent No.: US 9,480,054 B1
(45) Date of Patent: Oct. 25, 2016

(54) WIRELESS CHANNEL INTERFERENCE MITIGATION METHODS AND APPARATUS

(71) Applicant: Luminate Wireless, Inc., Cupertino, CA (US)

(72) Inventors: Brett Schein, Mountain View, CA (US); Amit Butala, Sunnyvale, CA (US)

(73) Assignee: LUMINATE WIRELESS, INC., Cupertino, CA (US)

( * ) Notice: Subject to any disclaimer, the term of this patent is extended or adjusted under 35 U.S.C. 154(b) by 51 days.

(21) Appl. No.: 14/610,032

(22) Filed: Jan. 30, 2015

(51) Int. Cl.
*H04B 7/185* (2006.01)
*H04W 4/00* (2009.01)
(Continued)

(52) U.S. Cl.
CPC ......... *H04W 72/0406* (2013.01); *H04W 52/34* (2013.01)

(58) Field of Classification Search
CPC ... H04W 24/08; H04W 28/18; H04W 40/10; H04W 52/08; H04W 52/34; H04W 52/143; H04W 52/262; H04W 52/283; H04W 52/322; H04W 52/325; H04W 52/327; H04W 52/346; H04W 52/367; H04W 72/0406; H04W 72/0473; H04W 72/0486; H04W 72/082; H04W 72/085; H04L 1/0003; H04L 1/0009; H04L 1/0021; H04L 1/0026; H04L 5/0007; H04L 5/0037; H04L 5/0053; H04L 5/0073; H04B 1/7103
USPC ................ 370/229–238, 252–253, 310–350, 370/400–401, 431, 437, 464–465, 468, 370/477–479; 455/13.4, 127.1, 447–464, 455/522
See application file for complete search history.

(56) References Cited

U.S. PATENT DOCUMENTS

| 7,096,021 B1 * | 8/2006 | Lehtinen ........... H04W 36/0094 455/436 |
| 7,388,845 B2 * | 6/2008 | Laroia ................... H04W 52/34 370/311 |

(Continued)

OTHER PUBLICATIONS

3GPP TS 36.413 V10.1.0, 3rd Generation Partnership Project; Technical Specification Group Radio Access Network; Evolved Universal Terrestrial Radio Access Network (E-UTRAN); S1 Application Protocol (S1AP) (Release 10), 256 pages, Mar. 2011.

(Continued)

*Primary Examiner* — Tri H Phan
(74) *Attorney, Agent, or Firm* — Michael P. Staub; Stephen T. Straub; Ronald P. Straub

(57) ABSTRACT

Methods and apparatus for mitigating interference which are well suited for high density deployments of small base stations are described. In various embodiments, control channel resources are intentionally not fully utilized. A control channel resource utilization parameter is set, e.g., as a function of interference, to limit base station average transmission power used for transmitting signals on control channel resources. By controlling utilization of control channel resources, e.g., by limiting resource utilization to result in a lower than possible, e.g., permitted, average transmission power level, the base station constrains the amount of interference to other nearby devices, e.g., base stations and UE devices. Nearby base stations operate and/or are controlled in a similar manner. As a result, nearby base stations which are causing interference to one another will reduce inter-base station interference. The restriction on resource utilization in some embodiments is increased as the amount of interference between base stations increases.

20 Claims, 8 Drawing Sheets

(51) Int. Cl.
*H04B 7/00* (2006.01)
*H04L 12/28* (2006.01)
*H04W 72/04* (2009.01)
*H04W 52/34* (2009.01)

(56) References Cited

U.S. PATENT DOCUMENTS

| | | | | |
|---|---|---|---|---|
| 8,077,662 | B2* | 12/2011 | Srinivasan | H04W 24/02 370/328 |
| 8,532,661 | B2 | 9/2013 | Vikberg et al. | |
| 9,107,110 | B2 | 8/2015 | Zdarsky et al. | |
| 2010/0091724 | A1* | 4/2010 | Ishii | H04W 52/32 370/329 |
| 2011/0149905 | A1 | 6/2011 | Kim | |
| 2012/0163336 | A1 | 6/2012 | Adjakple et al. | |
| 2013/0070731 | A1 | 3/2013 | Lim et al. | |
| 2013/0201904 | A1 | 8/2013 | Toskala et al. | |
| 2014/0274192 | A1* | 9/2014 | Zhu | H04W 8/005 455/522 |
| 2015/0245302 | A1* | 8/2015 | Lim | H04W 52/34 455/522 |

OTHER PUBLICATIONS

Internet Engineering Task Force (IETF), Request for Comments: 4862, IPv6 Stateless Address Autoconfiguration, 30 pages, Sep. 2007.
Enterprise small cell network architectures, Dec. 1, 2013, pp. 1-53, Release Two-Document 067.02.01, Small Cell Forum, UK.
3GPP TR 21.905 version 10.3.0 Release 10, Digital cellular telecommunications system (Phase 2+); Universal Mobile Telecommunications System (UMTS); LTE; Vocabulary for 3GPP Specifications, 65 pages, Mar. 2011.
3GPP TS 23.203 version 10.9.0 Release 10, Digital cellular telecommunications system (Phase 2+); Universal Mobile Telecommunications System (UMTS); LTE; Policy and charging control architecture, 134 pages, Sep. 2013.
3GPP TS 23.401 version 10.10.0 Release 10, LTE; General Packet Radio Service (GPRS) enhancements for Evolved Universal Terrestrial Radio Access Network (E-UTRAN) access, 281 pages, Apr. 2013.
3GPP TS 29.303 V10.4.0, 3rd Generation Partnership Project-;Technical Specification Group Core Network and Terminals; Domain Name System Procedures; Stage 3 (Release 10), 56 pages, Sep. 2012.
3GPP TS 33.401 version 10.5.0 Release 10, Digital cellular telecommunications system (Phase 2+); Universal Mobile Telecommunications System (UMTS); LTE; 3GPP System Architecture Evolution (SAE); Security architecture, 118 pages, Jul. 2013.
3GPP TS 36.300 version 10.11.0 Release 10, LTE; Evolved Universal Terrestrial Radio Access (E-UTRA) and Evolved Universal Terrestrial Radio Access Network (E-UTRAN); Overall description; Stage 2, 211 pages, Sep. 2013.
3GPP TS 36.401 version 10.4.0 Release 10, LTE; Evolved Universal Terrestrial Radio Access Network (E-UTRAN); Architecture description, 22 pages, Jul. 2012.
3GPP TS 36.412 version 10.1.0 Release 10, LTE; Evolved Universal Terrestrial Radio Access Network (E-UTRAN); 51 signalling transport, 10 pages, Jun. 2011.
3GPP TS 36.413 version 9.8.0 Release 9, LTE; Evolved Universal Terrestrial Radio Access Network (E-UTRAN); S1 Application Protocol (S1AP) (Release 10), 248 pages, Jan. 2012.
3GPP TS 36.413 version 10.6.0 Release 10, LTE; Evolved Universal Terrestrial Radio Access Network (E-UTRAN); S1 Application Protocol (S1AP), 262 pages, Jul. 2012.
3GPP TS 36.423 version 10.7.0 Release 10, LTE; Evolved Universal Terrestrial Radio Access Network (E-UTRAN); K2 Application Protocol (X2AP), 137 pages, Sep. 2013.
Internet Engineering Task Force (IETF), Request for Comments: 6296, IPv6-to-IPv6 Network Prefix Translation, 32 pages, Jun. 2011.
3GPP TS 23.007 version 10.7.0 Release 10, Digital cellular telecommunications system (Phase 2+); Universal Mobile Telecommunications System (UMTS); LTE; Restoration procedures, 54 pages, Apr. 2012.
3GPP TS 36.331 version 9.15.0 Release 9, LTE; Evolved Universal Terrestrial Radio Access (E-UTRA); Radio Resource Control (RRC); Protocol specification, 265 pages, Jul. 2013.
3GPP TS 36.133 version 10.16.0 Release 10, LTE;Evolved Universal Terrestrial Radio Access (E-UTRA); Requirements for support of radio resource management, 728 pages, Nov. 2014.
3GPP TS 36.213 version 10.12.0 Release 10, LTE; Evolved Universal Terrestrial Radio Access (E-UTRA); Physical layer procedures, 129 pages, Mar. 2014.
3GPP TS 36.211 version 10.7.0 Release 10, LTE; Evolved Universal Terrestrial Radio Access (E-UTRA); Physical channels and modulation, 103 pages, Apr. 2013.
3GPP TS 36.212 version 10.8.0 Release 10, LTE; Evolved Universal Terrestrial Radio Access (E-UTRA); Multiplexing and channel coding, 81 pages, Jul. 2013.
3GPP TS 36.101 version 10.16.0 Release 10, LTE; Evolved Universal Terrestrial Radio Access (E-UTRA); User Equipment (UE) radio transmission and reception, 340 pages, Nov. 2014.
"Propagation data and prediction methods for the planning of indoor radiocommunication systems and radio local area networks in the frequency range 900 MHz to 100 GHz", Recommendation ITU-R P.1238-7, Feb. 2012, pp. 1-28, International Telecommunication Union, Geneva.
Enhancing LTE Cell-Edge Performance via PDCCH ICIC, 2011, pp. 1-16, Fujitsu Network Communications Inc., Downloaded from http://www.fujitsu.com/downloads/TEL/fnc/whitepapers/Enhancing-LTE-Cell-Edge.pdf.
Perez-Vega, Garcia, "A Simple Approach to a Statistical Path Loss Model for Indoor Communications", 27th European Microwave Conference, Sep. 8-12, 1997, pp. 617-623, Downloaded from personales.unican.es.
S. Dolinar et al. "Code Performance as a Function of Block Size", TMO Progress Report 42-133, May 15, 1998, pp. 1-23, Downloaded from www.inference.phy.cam.ac.uk/ear23/papers/iscta.pdf).
3GPP TS 36.422 version 10.1.0 Release 10, LTE; Evolved Universal Terrestrial Radio Access Network (E-UTRAN); X2 signalling transport, 10 pages, Jun. 2011.
3GPP TS 29.281 version 10.3.0 Release 10, Universal Mobile Telecommunications System (UMTS); LTE; General Packet Radio System (GPRS) Tunnelling Protocol User Plane (GTPv1-U), 27 pages, Oct. 2011.
Internet Engineering Task Force (IETF), Request for Comments: 5996, Internet Key Exchange Protocol Version 2 (IKEv2), 138 pages, Sep. 2010.
Internet Engineering Task Force (IETF), Request for Comments: 4193, Unique Local IPv6 Unicast Addresses, 16 pages, Oct. 2005.
Internet Engineering Task Force (IETF), Request for Comments: 1918, Address Allocation for Private Internets, 9 pages, Feb. 1996.
Internet Engineering Task Force (IETF), Request for Comments: 2131, Dynamic Host Configuration Protocol, 24 pages, Mar. 1997.
Internet Engineering Task Force (IETF), Request for Comments: 3315, Dynamic Host Configuration Protocol for IPv6 (DHCPv6), 101 pages, Jul. 2003.

\* cited by examiner

WIRELESS CHANNEL INTERFERENCE MITIGATION METHODS AND APPARATUS

FIELD

The invention relates to wireless networks and more particularly to methods and apparatus for mitigating interference in wireless networks with multiple base stations, where the base stations maybe, e.g., base stations of small cells, e.g., femto cells.

BACKGROUND

While various communications standards have been designed with interference between base stations in mind, i.e., inter-base station also sometimes referred to as inter-cell interference, most communications standards were not designed with high density small cells in mind. In fact, most communications protocols such as LTE were designed with the idea of relatively large cells in mind where the base stations would be placed relatively far apart and with base station transmissions being from towers on ground with neighbor base stations also transmitting from similar towers at another ground location.

As the density of base stations increases, networks of wireless base stations may suffer from significant inter-base station interference. In many wireless protocols, the control channel is particularly susceptible to interference, which results in poor control channel signal quality.

In most systems, even though which may have contemplated small cells, the communications standards which are used often failed to contemplate interference from cells located above and below a base station in addition to the left and right of a base station. In the case where small cells may have been contemplated, such systems normally did not anticipate significant interference from above and below. The possibility of neighboring base stations vertically as well as horizontally, e.g., with interference base stations on all sides as well as above and below a base station was in most cases not designed for when standards developed many of the control channel structures currently in use for wireless transmissions.

Such a multi-directional interference situation is a situation which may occur in a multi-floor apartment building or multi-level office building in which small cells, e.g., femto base stations, may be deployed on floors above and below a femto or other small base station in addition to the sides of the base station on the same floor of the building.

As should be appreciated, a high density small cell deployment may result in interference from directions and in different amounts than was contemplated and expected for larger or lower density deployments than are encountered in high density small cell environments.

The loss of control channel messages, e.g., traffic channel resource assignment signaling, can be particularly detrimental to communications systems given that the failure of a device to receive a channel assignment message or traffic channel resource assignment message may result in the traffic channel resource going unused, and it can delay data communication between the device and the base station.

In view of the above it should be appreciated that there is a need for improved methods and apparatus for mitigating interference in wireless communications channels, e.g., control channels, in a wireless communications systems. It would be desirable, but not critical, if the methods and/or apparatus were well suited for use in high density small cell deployments and/or could be used to increase the chance of control signals being received as compared to some known systems designed for use by macro base stations.

SUMMARY

Methods and apparatus for mitigating interference between base stations are described.

The methods and apparatus of the present invention are well suited for a wide range of application but are particularly well suited for high density deployments. Some examples of whether the methods and apparatus of the present invention are particularly well suited for use include office building and/or apartment building deployments where a small base station, e.g., femto cells, may have an interfering base station located above and/or below another small base station in addition to having an interfering base station on the same building floor horizontally adjacent to the small base station subject to the interference.

In accordance with various embodiments, control channel resources are intentionally not fully utilized. That is, in at least some embodiments control channel resources of a frame and/or subframe are not fully utilized to the extent possible, e.g., permitted, by a communications standard, e.g., an LTE standard, with which the base station communications comply, a government regulation, or which can be supported by a power amplifier of the base station. In some embodiments the maximum average possible transmission power is the maximum average transmission power supported by the transmitting device, e.g., base station, because of a power transmission constraint due to a communications standard, government regulation or physical hardware limitation of the transmitting device, e.g., power amplifier limitation. Similarly a maximum possible transmit power may be, and in some embodiments is a maximum transmit power imposed by a government regulation, a communications standard or a maximum transmit power which can be supported by a power amplifier of the base station.

In some embodiments a control channel resource utilization parameter is set at a base station which is subject to interference to limit base station average transmission power used for transmitting signals on control channel resources. In some embodiments the control parameter is set to limit the average transmission power used for transmitting signals on control channel resources, e.g., resources of an assignment channel, in frames to be a fraction of a maximum possible average transmission power level. The fraction is normally less than the maximum possible average transmission power level when the base station is subject to interference and may be determined based on the level of interference received at a base station, reported by another base station and/or a control signal received from a control device such as a management entity in the network. Thus, transmission power, depending on the setting of the control parameter, may be below or up to the maximum possible transmit power.

By controlling utilization of control channel resources, e.g., by limiting resource utilization to result in a lower than possible average transmission power level, the base station constrains the amount of interference it creates to other nearby devices, e.g., base stations and UE devices. Nearby base stations operate and/or are controlled in a similar manner. As a result, nearby base stations which are causing interference to one another will reduce inter-base station control channel interference. The restriction on resource utilization may, and in some embodiments is, increased as the amount of interference between base stations increases.

Thus, as interference increases the amount of control channel resource utilization at an individual base station will be decreased.

In some cases, the power control at a base station is achieved by allowing some of the control channel resources to go unused. The control channel resources that are intentionally left unused are, in some cases, assignment channel resources used to communicate assignment of traffic channel resources, e.g., uplink and/or downlink, traffic channel resources, to UE (User Equipment) devices such as mobile cell phones and/or wireless terminals. While intentionally leaving some control channel resources unused in each frame is one way of achieving the constrained average transmission power level on the control channel resources of the frame, an alternative approach is to use a lower transmission level for control channel signaling than would be used if a higher average control channel transmission power level were used.

While reduced utilization of control channel resources may seem wasteful, the failure of a UE to receive a traffic channel assignment message is particularly detrimental. This is because a UE which fails to receive a traffic channel assignment message successfully, e.g., because of interference, will not utilize the corresponding traffic channel resources that were being assigned. In the case of a downlink, not only will the unsuccessfully received assignment be interference to other devices in the system but any traffic data transmitted on the corresponding traffic channel resources will also be interference to other devices and will not be received by the intended recipient who did not successfully receive the assignment message.

By using control channel resources, and traffic channel assignment resources in particular, less than the amount permitted by the communications standard, successful communication and overall system throughput may, in at least some cases, be increased rather than decreased. Such a counter-intuitive outcome is a desirable result.

In various embodiments, the amount the average transmission power of control channel resources is constrained is determined based on interference measured at the base station and/or reported by other base stations. As the level of interference increases, in some embodiments the utilization of traffic channel assignment resources is decreased. This may be, and in some embodiments is achieved by reducing the number of devices to which traffic channel resources are allocated. In some embodiments as control channel resource utilization is constrained, the number of traffic channel assignments per frame is decreased. However, in at least some such embodiments the average size of the traffic channel resource being assigned is increased. In this manner, while control channel resource utilization will decrease in some embodiments as the utilization control parameter changes or is adjusted to reduce control channel utilization, the average size of traffic assignments is increased. However, this is not critical and while used in some embodiments, the automatic changing of the size of traffic channel assignments as a function of the control channel resource utilization parameter is not implemented in all embodiments. Notably, in various embodiments the data channel used to communicate traffic data is transmitted at a lower power level than the control channel and thus utilization of the traffic channel does adversely impact communications of control information transmitted by other base stations as much as the higher power control channel transmission do. The constraints on average transmission power level may be dynamically changed in response to changes in detected interference, reported interference and/or in response to received control signals. Thus, in various embodiments, control channel resource utilization can be varied as interference changes. For example, as more small cells are deployed and interference goes up, base stations in the vicinity of the newly deployed base stations may decrease their use of control channel resources. Such a dynamic adaptation of control channel resource utilization may be, and in some embodiments is, based on interference measurements without the need for a centralized controller and/or direct negotiations between base stations or other control signal exchanges between base stations.

In order to reduce and/or limit interference due to traffic channel transmissions, in some but not necessarily all embodiments base stations control their average transmission power used for traffic channel transmissions to be less than the average transmission power used for control channel transmissions. Thus, in at least some such embodiments, as the average control channel transmission power is constrained to be less than the maximum average possible amount, where the maximum possible amount may be an amount allowed by a communications standard being used, a government regulation or device capability, average traffic channel transmission power will be reduced and/or constrained in some but not necessarily all embodiments by at least the same or a larger amount relative to the maximum average traffic channel transmission power permitted by the communications standard being used.

Numerous additional features, benefits and embodiments will be discussed in the detailed description which follows.

DETAILED DESCRIPTION

Various features of the present invention enable reducing inter base station interference, e.g., on the control channels in an FDD system, in a variety of ways thereby raising the control channel quality. Various aspects of the invention are discussed in the context of an LTE network and FDD air interface subframe structure where multiple subframes are included in a frame.

Figure 1:
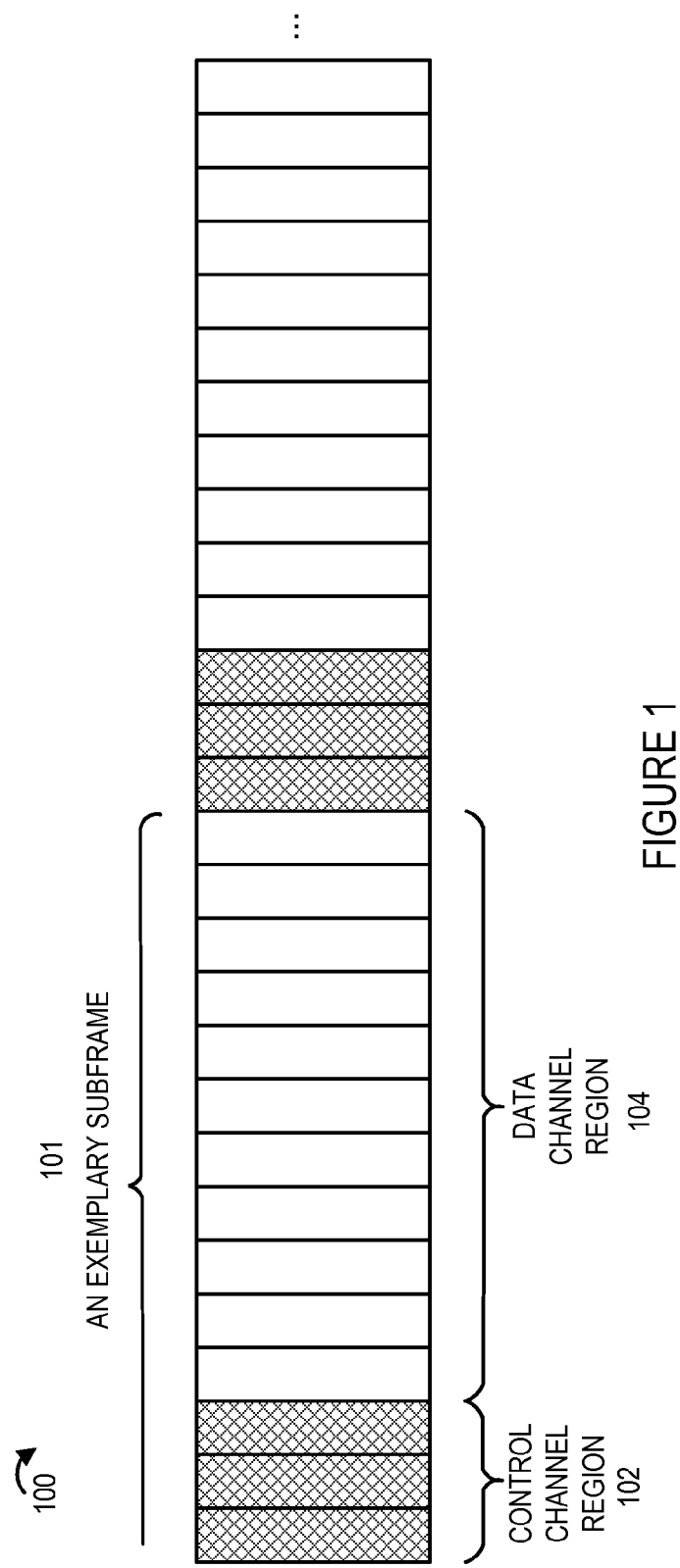
FIG. 1 illustrates an exemplary subframe structure which repeats multiple times as part of the structure of a frame.

An LTE FDD air interface has a subframe structure comprised of a number of successive OFDM symbols. FIG. 1 illustrates an exemplary subframe 101 which includes 14 symbols per subframe with normal cyclic prefix, with multiple subframes corresponding to a frame. While FIG. 1 shows symbols corresponding to the first subframe 101 and a portion of a second subframe, a complete frame includes multiple symbols some of which are not shown. By limiting transmission power and/or control channel resource utilization in a subframe, transmission power and/or control channel resource utilization in the frame which includes multiple subframes can be and in some embodiments is achieved. One exemplary subframe structure 100 is shown in FIG. 1 in which the vertical axis represents frequency and the horizontal axis represents time with each vertical division on the horizontal axis corresponding to a different symbol time. Each symbol corresponds to multiple tones along the frequency axis. The combination of one tone for one symbol time is sometimes referred to as a tone symbol. Power can be placed on tone symbols of a symbol to communicate information. The amount of power can vary from tone symbol to tone symbol. The first several symbols of a subframe are used for control channel information with the group of symbols 102 used for control channel information being indicated as the control channel region 102 in FIG. 1, while the remaining symbols of the subframe 100 corresponding to reference number 104 are used for data channel information, e.g., the communications of data to/from UE devices. The control channel region 102 may be divided, e.g., allocated, to different control channels. One or more such control channels may be used for communicating allocation of traffic channel resources to UE devices. For example, portions of control channel region 102 corresponding to one or more assignment channels may be used to communicate traffic channel assignments which are used to indicate to individual UEs or groups of UEs which traffic channel resources in the group of symbols used to communicate data, i.e., resources in the data channel region 104, a device has been assigned to use. Transmission power can be limited on individual symbols/resources and/or some transmission resources, e.g., frequency/tone resources, maybe left intentionally unused.

Figure 2:
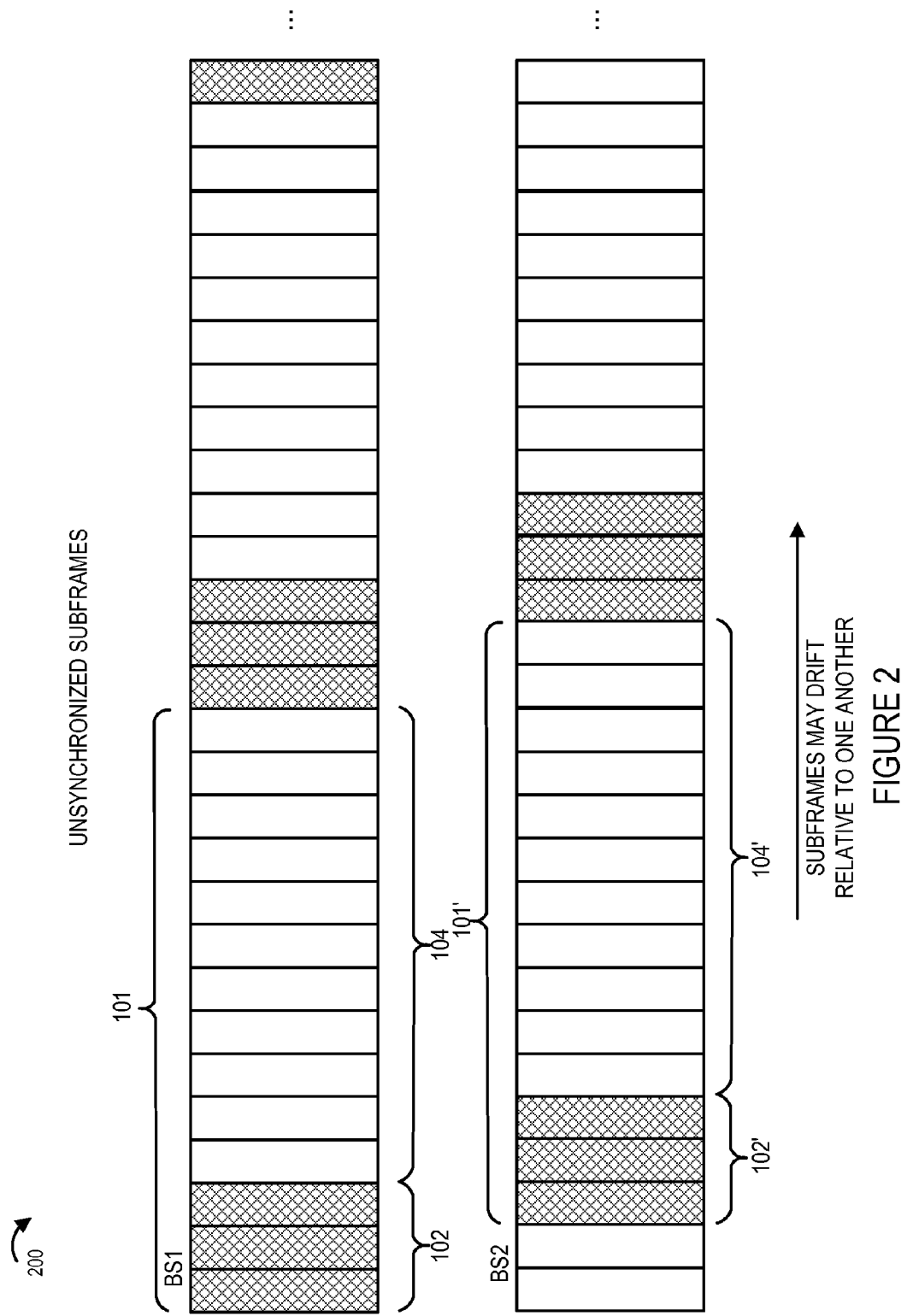
FIG. 2 illustrates a drawing showing frame structures corresponding to two neighboring base stations with the subframe boundaries of the two neighboring base stations being unsynchronized.

In practice, different base station cells may have their subframe boundaries completely unsynchronized, so that the control channel region of one base station cell may overlap arbitrarily with the control and/or data channel regions of neighboring base stations, and the relative subframe positions may drift over time and/or be offset as shown in diagram 200 which includes exemplary timing information for two potentially adjacent base stations, BS1 and BS2. In FIG. 2, the top portion of the diagram shows the subframe timing structure of a first base station BS1 while the bottom portion shows the subframe timing for BS2. Reference numerals in FIG. 2 are used to refer to the same elements as used in FIG. 1 but with a prime ' being added to indicate portions of the timing diagram corresponding to the second base station. For example, reference number 101 refers to the first full subframe shown in FIG. 2 of BS1 while reference number 101' is used to refer to the first full subframe of BS2. In FIG. 2, the subframe boundaries of the two neighboring base stations BS1 and BS2 are unsynchronized, with the control channel region of BS1 overlapping arbitrarily with the control and data channel regions of neighboring base station BS2. Furthermore the timing of BS1 and BS2 may drift relative to each other over time so that the relative synchronization and/or alignment of subframes between base stations may change with time. This may be used for small cells relative to macro cells, and in particular for small cells targeted for the residential market where the cost and complexity of maintaining synchronization between small cells may be undesirable.

Figure 3:
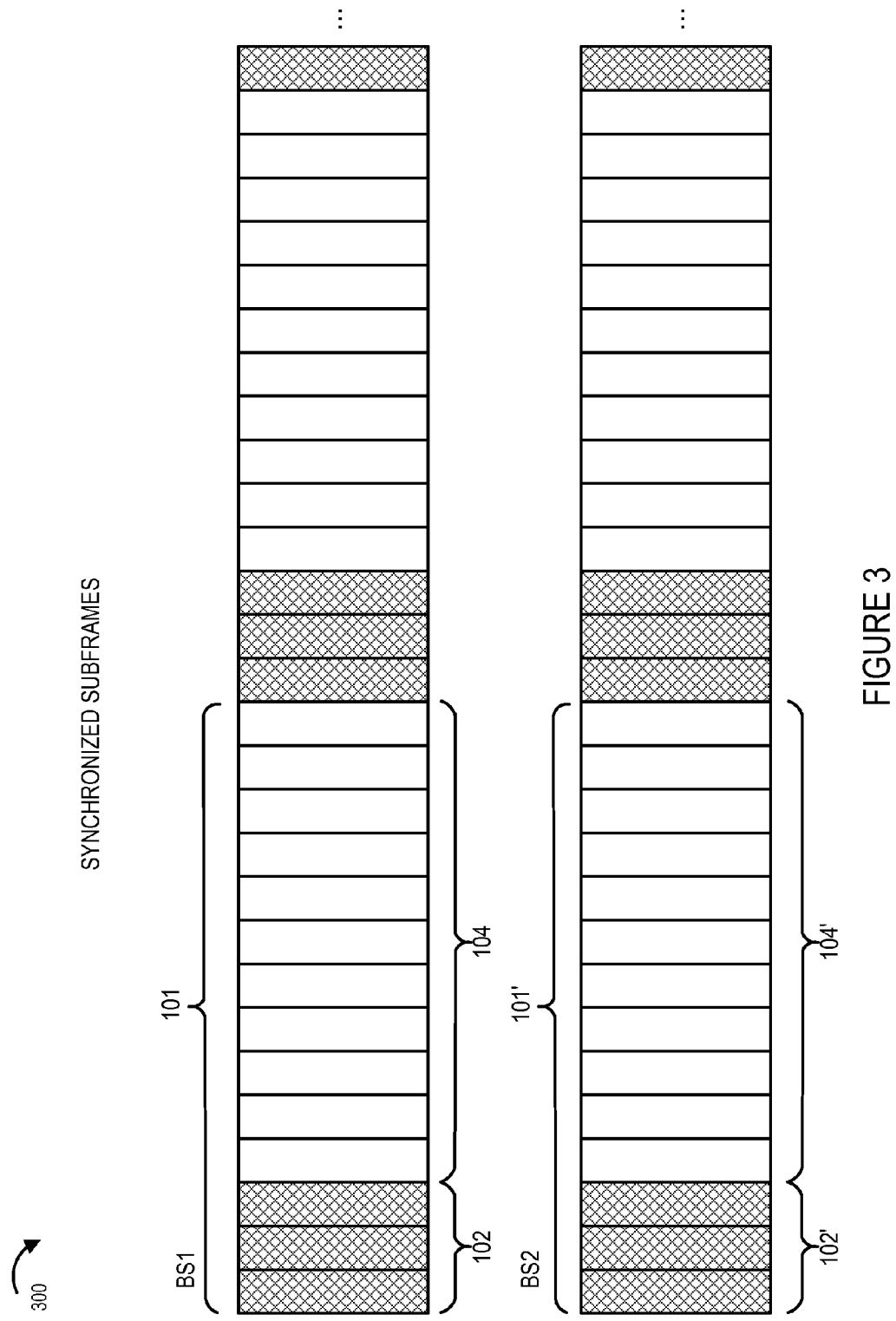
FIG. 3 illustrates a drawing showing frame structures corresponding to two neighboring base stations where the subframe boundaries of the two base stations are synchronized.
Figure 4:
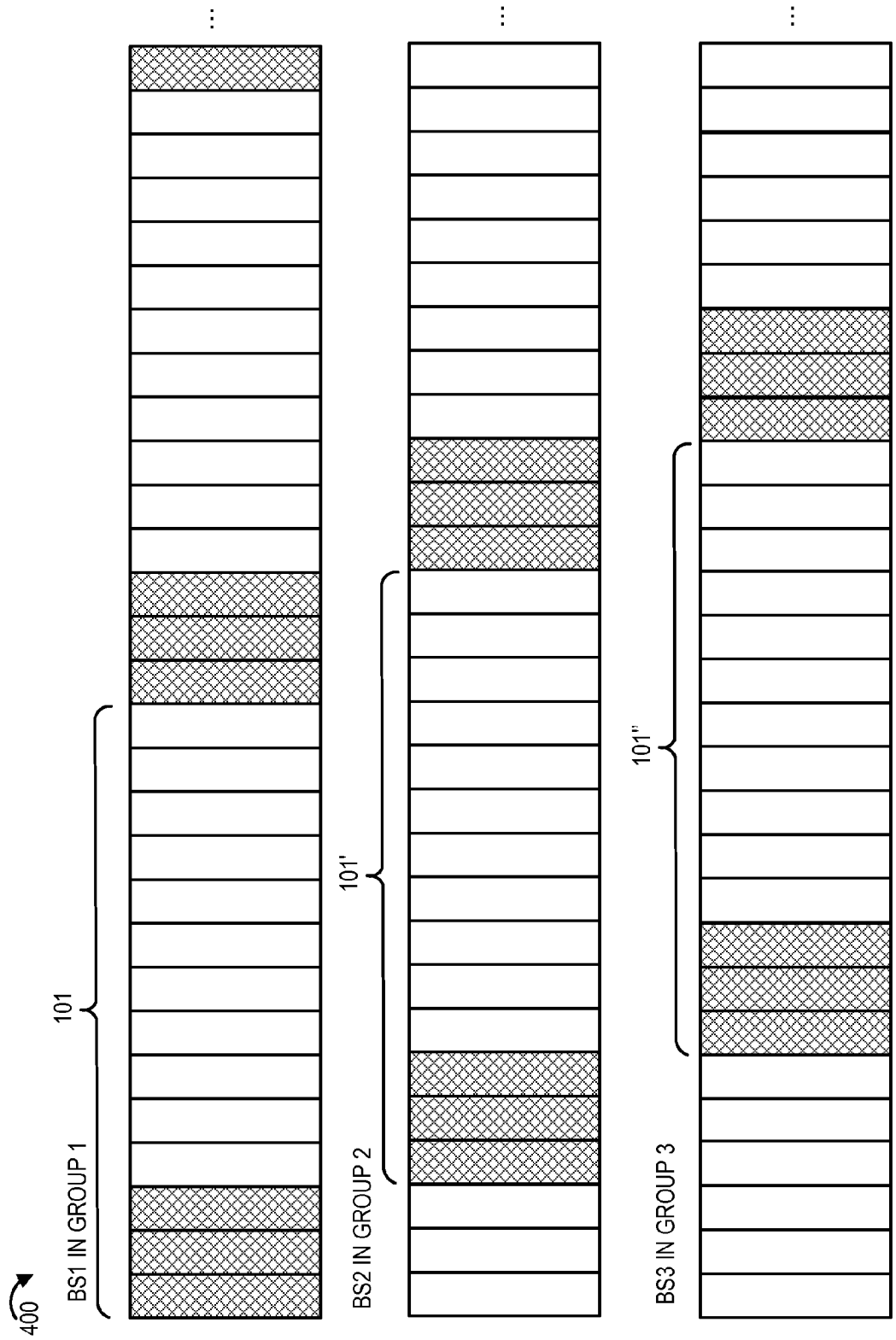
FIG. 4 illustrates exemplary subframe structures corresponding to base stations which are grouped into three coordination groups in accordance with an exemplary embodiment.

In some cases base station cells synchronize so that the subframes start at precisely the same time, and so that the control channel regions of neighboring cells precisely overlap. Such a case is illustrated in FIG. 3 which shows a diagram 300 in which the subframe boundaries of the two neighboring base stations BS1 and BS2 are synchronized with the control channel regions and data channel regions of BS1 and BS2 being aligned. This may accidently occur for periods of time in the case where BS1 and BS2 are unsynchronized with respect to each other and the frame timings drift relative to each other over time. However, such synchronization is intentional and is maintained in some embodiments. Intentional synchronization of base stations in the manner shown in FIG. 3 may be, and sometimes is, used in a deployment of collections of small cells relative to each other, macro cells relative to each other, and/or for macro and small cells relative to each other when they coordinate for interference management. FIG. 4 is a diagram 400 showing an implementation where three cells are synchronized to the level of a sub-frame.

In accordance one aspect of a first embodiment average transmission power on control channel resources is constrained to be less than the maximum average transmission power permitted by the communications standard being used and/or a maximum average transmit power output of a component, e.g, the power amplifier used in a transmitter, of the transmitting device, e.g., base station. Thus, the maximum possible transmit power may be based on either a standard or governmental average max transmit power limitation or transmitter capability with the constraint being set to be equal to, or in many cases less than, the maximum possible average transmit power.

Average transmission power is constrained by limiting transmission power on one or more control channel resources, e.g., tone-symbols. In some embodiments the maximum number of control channel resources that are used per subframe, and thus frame, is limited to less than the full number available. This may be viewed as reducing the transmission power used on one or more tone symbols of a symbol in the control channel region to zero. This may be done for one or more access points (APs), also referred to as base stations. By limiting transmission power on control channel resources in a deliberate manner, interference to other devices is limited. Thus, in some embodiments, the number of resources with energy transmitted within the control channel region is limited to less than the number of resources available for use. In LTE, the control channel resources used by one base station for each control channel message are pseudo randomly spread over the control channel region. Thus in some embodiments, by limiting the total control channel region occupancy, the relative interference power from neighboring base stations' control regions is reduced by the fraction of the control channel region left unused. Such an approach is well suited for application to assignment channel resources and/or the resources of other control channels.

In some but not necessarily all embodiments, base station control channel region power is set higher than that of the data channel region with reductions in average control channel transmission power being reflected with corresponding reductions in average data (e.g., traffic) channel transmission power. By maintaining a difference between data and control channel average transmission power levels, the relative interference power from neighboring base stations' data regions is reduced relative to nominal control channel power as compared to systems where control and data channels use the same transmit power levels An implementation in accordance with the first embodiment does not require time synchronization or time and power coordination between base station cell subframes. This simplifies system wide implementation in terms of both (i) not requiring relative subframe timing control, and (ii) not requiring additional air interface scheduling complexity for interference coordination between neighboring cells. However, the power management and/or resource utilization features described with regard to embodiments where base stations are unsynronized relative to one another can also be, and sometimes are, applied to embodiments where base stations have frame and/or subframe structures which are synchronized relative to one another.

Thus, in accordance with various embodiments, higher power is used for control channel regions as compared to data channel regions with this power control approach being used for a number of access points (APs), e.g., adjacent access points. In some such embodiments APs are grouped into coordination groups. Such groups can be determined in many ways, for example, based on Self-Organizing Network (SON) learned topology and/or network usage and performance history. In some such embodiments the subframe boundaries are precisely aligned within coordination groups, and the subframe boundaries are deliberately offset between groups to align the control channel regions of one group with the data channel region of the others. FIG. 4 includes a diagram 400 of one such embodiment illustrating exemplary subframe structures corresponding to base stations which are grouped into three coordination groups represented as BS1, BS2 and BS3. In the simplest implementation BS1, BS2 and BS3 corresponding to 3 adjacent base stations. The base stations may be femto cell base stations and/or macro cell base stations. For example, BS1 and BS2 may be femto cell base stations with BS3 being a macrocell base station. Alternatively all three base stations may be of the same type, e.g., femto cell base stations or macrocell base stations. The base stations in the FIG. 4 example may have overlapping coverage areas thus causing interference to one another.

Base station BS1 is in group 1, base station BS2 is in group 2 and base station BS3 is in group 3. Reference number 101 is used in FIG. 4 to represent a subframe of BS1, number 101' is used to represent a subframe of BS2 and reference number 101" is used to represent a subframe of BS 3. Normally the frames of BS1, BS2, BS3 will each include the same number of subframes so that subframe synchronization is maintained over time. In addition in the FIG. 4 embodiment the first, second and third base stations are synchronized to a common timing reference so that the illustrated timing between the base stations does not drift and remains constant over time. Note in FIG. 4 that the subframe boundaries of BS1, BS2 and BS3 are deliberately offset to align the control channel regions of one group with the data channel region of the other base stations so that the control channel regions are subject to interference from the lower power data transmission of other base stations rather than the higher power control channel transmissions. In this embodiment there is a trade off of higher control channel region signal quality (SINR) for lower data channel region signal quality (SINR). Such an embodiment does not require time and power coordination complexity in the air interface schedulers of the base station cells but rather simply high level subframe timing synchronization between base stations.

From the above discussion some advantages of various features of the present invention should be apparent to one of skill in the art. In particular, some but not necessarily all embodiments of the invention do not require any time alignment or time and power coordination between base stations. While some other embodiments use time alignment, e.g., relative frame time offsets, they do not require a precisely coordinated time and power schedule that takes into consideration the devices which will be using the resources and can rely on the simple fact that data channel transmissions will be at a lower power level than control channel submissions.

Figures 5, 5A, 5B:
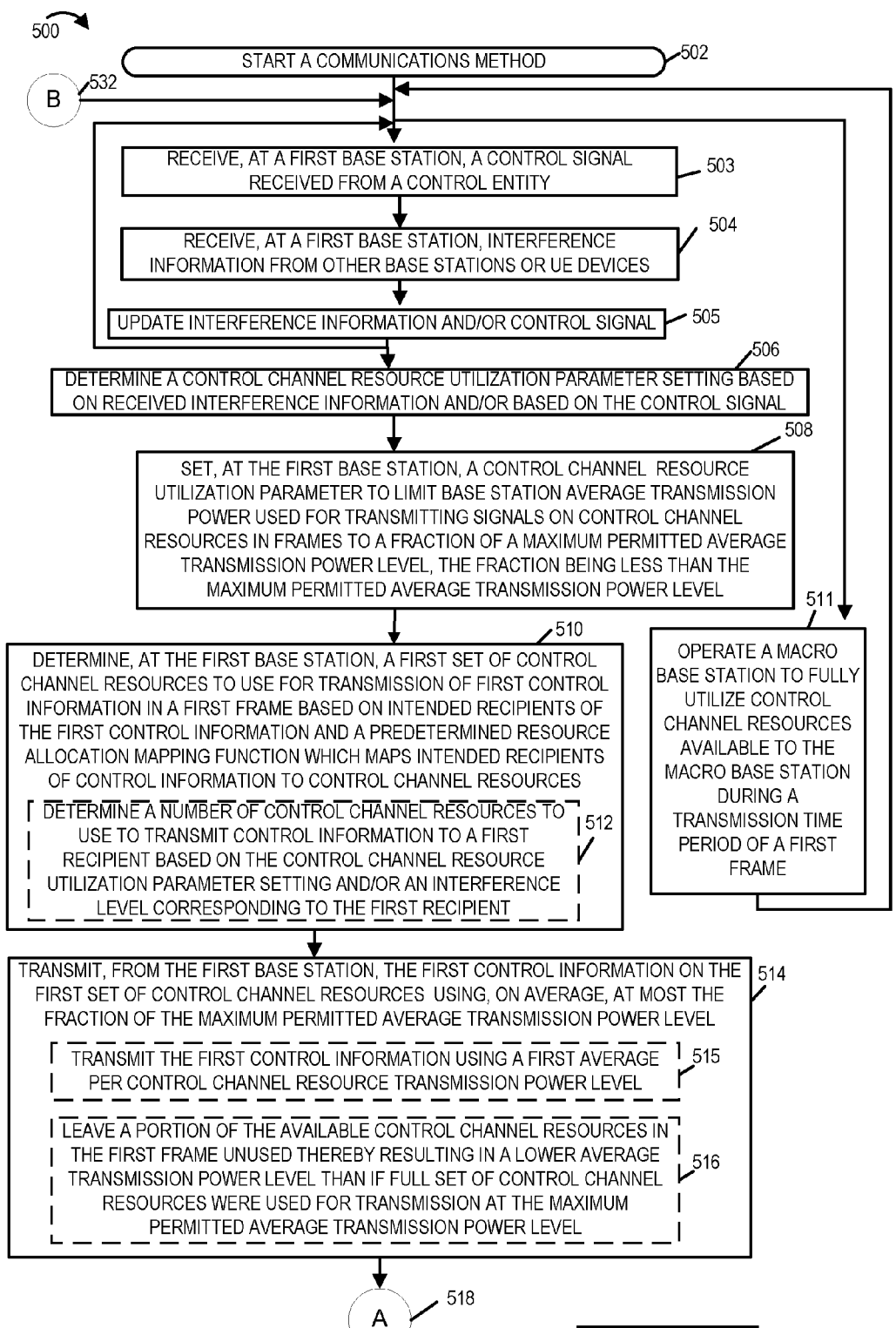
FIG. 5, which comprises the combination of FIGS. 5A and 5B, is a flowchart illustrating the steps of an exemplary communications method in accordance with some embodiments of the invention.
Figure 5B:
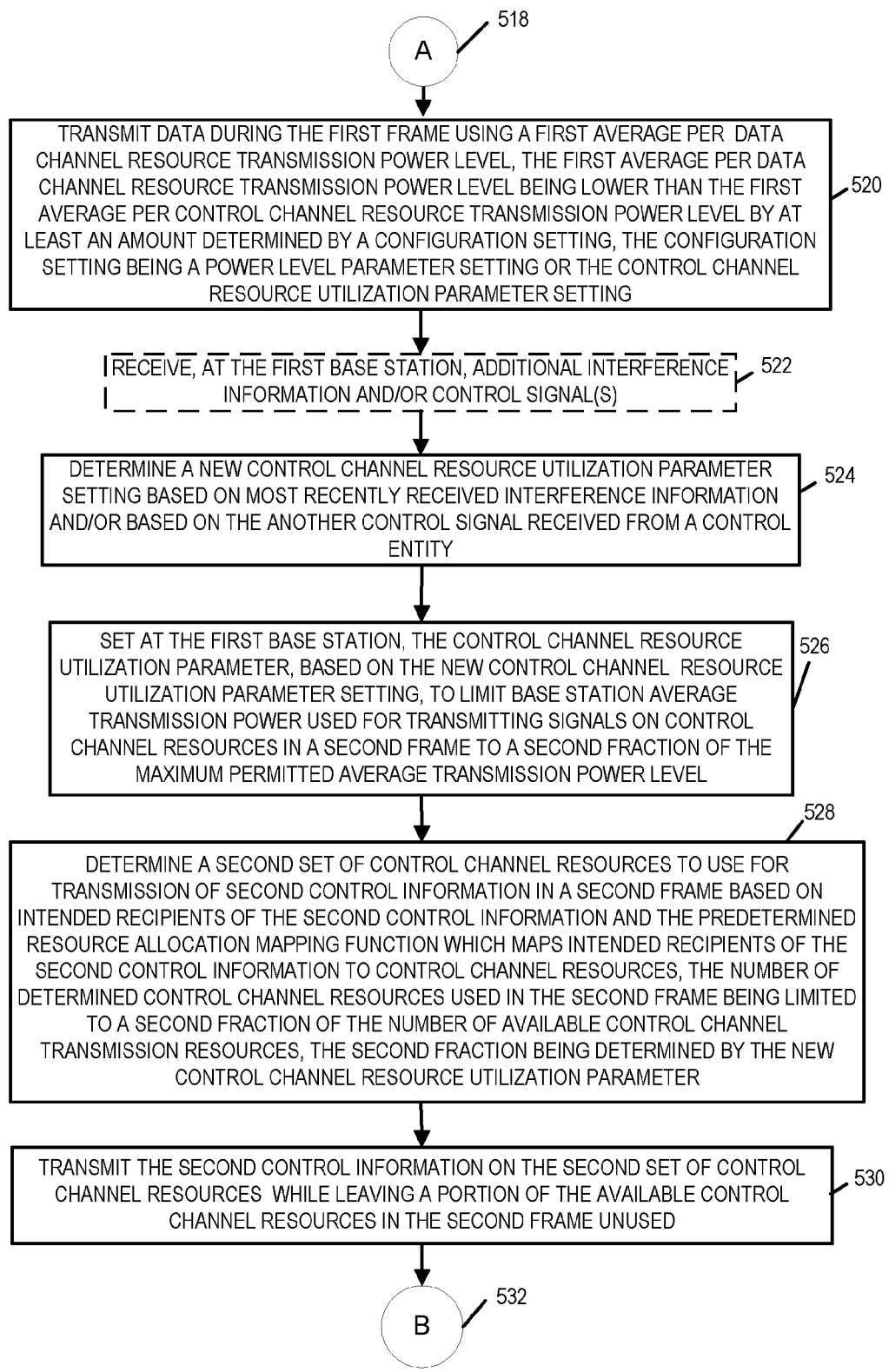

FIG. 5, which comprises the combination of FIGS. 5A and 5B, is a flowchart 500 illustrating the steps of an exemplary communications method in accordance with some embodiment. In some embodiments various steps of the flowchart 500 of FIG. 5 are implemented by a first base station, e.g., such as the base station illustrated in FIG. 6. The exemplary method begins in start step 502 with the first base station being powered on and monitoring to receive interference information, e.g., from neighboring base stations, control entity/network nodes, and/or UE devices.

Operation proceeds from start step 502 to step 503. In step 503 a control signal is received, at a first base station, from a control entity, e.g., a network control node/regional controller. In some embodiments the control entity receives interference information from multiple base stations and communicates the control signal to the first base station which allows the base station to determine one or more control/operational parameters in accordance with the invention.

In step 504 interference information is received, at the first base station, from other base stations or UE devices. In some embodiments the interference information is received on a periodic basis and the receiving step 504 may be repeated. Operation proceeds from step 504 to step 505.

In step 505 the first base station updates interference information and/or control signal, e.g., based on the recently received interference information and/or control signaling. In various embodiments the steps 503, 504 and 505 are performed on an ongoing basis, e.g., with the first base station receiving interference information from one or more base stations or UE devices and control signals from the control entity over time and updating the interference information and/or control signal information.

Operation proceeds from step 505 to step 506 in which the first base station determines a control channel resource utilization parameter setting based on the received interference information received from other base stations or UE devices or based on the control signal received from the control entity. In some embodiments the determination is performed based on the most recent updated interference information received by the base station. In accordance with one aspect of the invention, the control channel resource utilization parameter controls the base station to use one or more communications resources, e.g., time, frequency, power etc., in a manner that mitigates wireless channel interference, e.g., control channel interference. Operation proceeds from step 506 to step 508. In step 508 the first base station sets a control channel resource utilization parameter to limit base station average transmission power used for transmitting signals on control channel resources in frames (e.g., frames including subframes such as the one illustrated in FIGS. 1-4) to a fraction of a maximum possible average transmission power level, the fraction being less than the maximum possible average transmission power level. Thus in accordance with one aspect of some embodiments the usage of available transmission power for transmitting signals on control channel resources is limited which results in use of reduced average transmission power in the control channel than the maximum possible average transmission power level. In various embodiments the control channel resource utilization parameter controls the base station to limit the average transmission power used for transmitting signals to less than the maximum possible average transmission power level by limiting the maximum transmission power used for transmitting signals on at least some control channel resources to less than the maximum possible average transmission power level. In some embodiments limiting the maximum transmission power used for transmitting signals on at least some control channel resources to less than the maximum possible average transmission power level involves setting the transmit power on some control channel resources to zero thereby leaving such control channel resources unused. Thus in some embodiments control channel resource utilization parameter limits the base station to use less than the maximum possible average transmission power, e.g., half, or one third or one fourth etc., to transmit control signals on at least some of the control channel resources.

Operation proceeds from step 508 to step 510. In step 510 the first base station determines, a first set of control channel resources to use for transmission of first control information in a first frame based on intended recipients of the first control information and a predetermined resource allocation mapping function which maps intended recipients of control information to control channel resources. In various embodiments the first control information is, e.g., assignment information to assign data channel resources to user devices. The control channel resources may be used to transmit control information to one or a plurality of recipients. In some embodiments there is a predetermined mapping between the control channel resources in a control frame to the recipients (receiving devices) to which these resources are allocated, e.g., for communication of control information. In various embodiments this mapping is determined by the predetermined resource allocation mapping function. The first set of control channel resources in the first frame may include a plurality of control channel resources out of the full set of resources in the first frame.

In some embodiments the intended recipients include a first recipient. In some such embodiments step 510 includes sub-step 512 in which the first base station determines a number of control channel resources to use to transmit control information to the first recipient based on the control channel resource utilization parameter setting and/or an interference level corresponding to the first recipient (e.g., number of resources may be determined in part based on the utilization parameter setting, i.e., fewer resource segments may be used the higher the number of resources which are known to be left unused based on the assumption that lower interference is likely to result). In some embodiments the first recipient is a UE device. Similarly, in some embodiments the first base station determines number of control channel resources to use to transmit control information to one or more other recipients. In some embodiments the first base station is one of a plurality of physically adjacent base stations and the plurality of physically adjacent base stations are configured to use the same control channel resource utilization setting. In some other embodiments the first base station is one of a plurality of physically adjacent base stations and at least one other base station in the plurality of physically adjacent base stations is configured to use a different control channel resource utilization setting than the first base station. In some embodiments the plurality of physically adjacent base stations are small cells (e.g., femto cells or LTE HeNBs) which are in the coverage area of a macro base station. In some such embodiments the method of flowchart 500 further includes performing step 511 which includes operating the macro base station to fully utilize control channel resources available to the macro base station during a transmission time period of the first frame. Thus it should be appreciated that in such embodiments while the first base station limits the use of its control channel resources, (e.g., by limiting the number of channel resources and/or limiting the average transmission power used for transmitting on the resources to be less than the maximum possible average power) the macro base station fully utilizes its control channel resources during a transmission time period of the first frame.

Operation proceeds from step 510 to step 514. In step 514 the first base station transmits the first control information on the first set of control channel resources using, on average, at most the fraction of the maximum possible average transmission power level. Thus in accordance with the features of some embodiments, the base station uses only a fraction of the maximum possible average transmission power level for transmitting control signals on the first set of resources in order to limit the usage of transmission power used in the control frame to an average below the maximum average transmission power level possible for use in the control frame over the time period corresponding to the control frame. In some embodiments step 514 includes steps 515 and 516. In some embodiments step 516 is performed wherein the first base station transmits the first control information using a first average per control channel resource transmission power level, e.g., an average transmission power used per control channel resource. In some embodiments the control channel resource utilization parameter controls the base station to utilize less than a full set of available control channel resources in the frame. In some such embodiments step 516 is performed wherein the base station is controlled to leave a portion of the available control channel resources in the first frame unused thereby resulting in a lower average transmission power level than if all the control channel resources were used for transmission at the maximum possible average transmission power.

Operation proceeds from step 514 to step 520 via connecting node A 518. In step 520 the first base station transmits data during the first frame using a first average per data channel resource transmission power level, the first average per data channel resource transmission power level being lower than the first average per control channel resource transmission power level by at least an amount determined by a configuration setting. In some embodiments the configuration setting is a power level parameter setting or said control channel resource utilization parameter setting. In some embodiments the power level parameter setting controls the base station to limit the average transmission power used for transmitting data on the data channel resources to be less than the average transmission power used for transmitting control signals on the control channel resources. Thus in some embodiments the average per data channel resource transmission power level used for transmitting data is less than the average per control channel resource transmission power level used for transmitting the control information in the first frame.

Operation proceeds from step 520 to step 522. In step 522 the first base station receives additional interference information, e.g., from one or more base station or UE devices, and/or control signal from the control entity. In some embodiments the additional interference information and/or control signaling is received as part of the steps 503 and 504 which are performed on an ongoing basis. Operation proceeds from step 522 to step 524. In step 524 the first base station determines a new control channel resource utilization parameter setting, e.g., based on the most recently received interference information, or based on the most recently received control signal. Operation proceeds from step 524 to step 526. In step 526 the first base station sets the control channel resource utilization parameter based on the new determined control channel resource utilization parameter setting to limit the base station average transmission power used for transmitting signals on control channel resources in a second frame to a second fraction of the maximum possible average transmission power level, the second fraction being less than the maximum possible average transmission power level. Thus the average transmission power available for transmitting signals on control channel resources in the second frame is limited to only a fraction of the maximum possible average transmission power level.

Operation proceeds from step 526 to step 528. In step 528 the first base station determines a second set of control channel resources to use for transmission of second control information in a second frame based on intended recipients of the second control information and the predetermined resource allocation mapping function which maps intended recipients of the second control information to control channel resources, the number of determined control channel resources used in the second frame being limited to a second fraction of the number of available control channel resources, said second fraction of the number of available control channel resources being determined by the new control channel resource utilization parameter.

Operation proceeds from step 528 to step 530. In step 530 the first base station transmits the second control information on the second set of control channel resources. Transmitting the second control information may involve leaving some resources unused or, alternatively, in some embodiments reducing power per control channel resource to satisfy the power transmission constraint indicated by the second fraction. The operation proceeds back to step 503 via connecting node B 532. The operation continues in this manner and various steps may be repeated.

Figure 6:
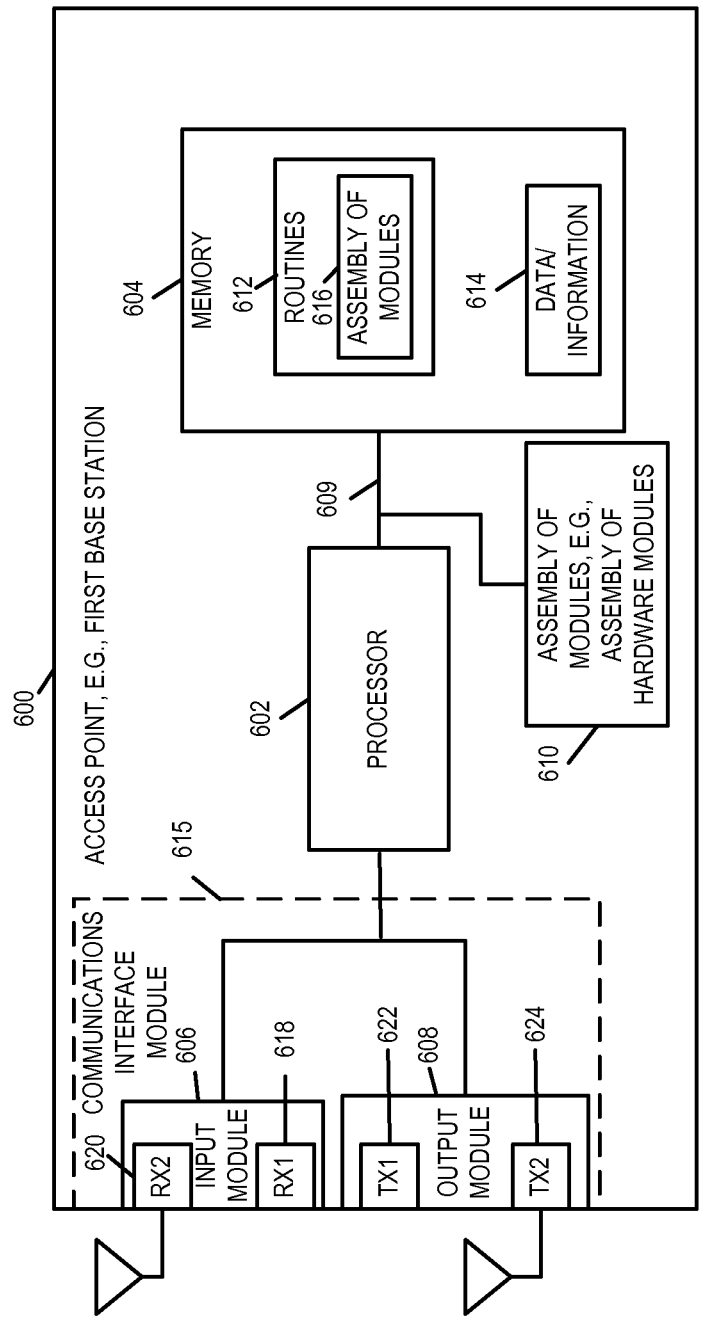
FIG. 6 illustrates an exemplary access point, e.g., base station, implemented in accordance with an exemplary embodiment.

FIG. 6 illustrates an exemplary access point, e.g., first base station 600, in accordance with an exemplary embodiment. In some embodiments the exemplary first base station 600 is a small cell, e.g., an LTE HeNB. The exemplary first base station 600 may be used to implement one or more steps of the methods discussed herein, for example, such as steps of flowchart 500 of FIG. 5.

The first base station 600 includes a processor 602, e.g., a CPU, memory 604, and an assembly of modules 610, e.g., an assembly of hardware modules, coupled together via a bus 609 over which the various elements may exchange data and information. The first base station 600 further includes an input module 606 and an output module 608, which are coupled to the processor 602. In various embodiments the input module 606 and the output module 608 are included as part of a communications interface module 615. In various embodiments, communications interface module 615 includes interfaces for communications with different types of devices, e.g., HGWs, UEs, SGWs, a PGWs, DNSs, MMEs, other access points, management devices, etc. and/or supporting a plurality of different communications protocols. The input module 606 and/or output module 608 may, and in some embodiments do, include a plurality of different ports and/or interfaces. Input module 606 includes a plurality of receivers including a first receiver RX 1 618 and a second receiver RX 2 620, which is a wireless receiver. Output module 608 includes a plurality of transmitters including a first transmitter TX 1 622 and a second transmitter TX 2 624, which is a wireless transmitter.

The first base station 600 receives signals including messages via input module 606. Exemplary signals received via the input module 606 include interference information signals, control signals, data signals etc., from one or more devices such as other base stations, UE devices control nodes and/or network nodes.

The first base station transmits signals including messages via output module 608. Exemplary signals transmitted via the output module 608 include control information signals, data signals and/or other information. Memory 604 includes routines 612 and data/information 614. Routines 612 includes an assembly of modules 616.

In some embodiments the processor 602 operates under control of routines stored in the memory 604. Thus, when executed by the processor 602, the instructions control the first base station 600 to perform the functions corresponding to one or more steps of the methods described herein, e.g., steps of method of flowchart 500. In some embodiments, the processor 602 is configured to perform the steps of the methods described as being performed by the first base station 600, e.g., by controlling one or more elements of the base station 600. The configuration of the processor may be achieved by using one or more modules, e.g., software modules, to control processor configuration and/or by including hardware in the processor, e.g., hardware modules, to perform the recited steps and/or control processor configuration. In some but not all embodiments the assembly of modules 606 includes a module corresponding to each of the steps of flowchart 500 that are performed by the base station 600. In some embodiments the functions corresponding to various steps of the method implemented by the base station 600 are performed by the hardware modules in the assembly of hardware modules 610 which may be controlled by the processor 602 to perform the functions.

In one exemplary embodiment the processor 602 is configured to control the first base station 600 to receive (via input module 606), a control signal from a control entity, e.g., a network control node/regional controller. In some embodiments the control entity receives interference information from multiple base stations. In some embodiments the processor 602 is configured to control the first base station 600 to receive (e.g., via receiver 620) interference information from other base stations or UE devices. In some embodiments the interference information is received on a periodic basis. In some embodiments the processor 602 is further configured to update interference information and/or control signal, e.g., based on the recently received interference information and/or control signaling.

In one embodiment the processor 602 is further configured to determine a control channel resource utilization parameter setting based on the interference information received from other base stations or UE devices or based on the control signal received from the control entity, set a control channel resource utilization parameter to limit base station average transmission power used for transmitting signals on control channel resources in frames to a fraction of a maximum possible average transmission power level, the fraction being less than the maximum possible average transmission power level, and determine, a first set of control channel resources to use for transmission of first control information in a first frame based on intended recipients of the first control information and a predetermined resource allocation mapping function which maps intended recipients of control information to control channel resources. In some such embodiments the processor 602 is further configured to determine a number of control channel resources to use to transmit control information to a first recipient based on the control channel resource utilization parameter setting and/or an interference level corresponding to the first recipient. In some embodiments the first recipient is a UE device.

In various embodiments the control channel resource utilization parameter controls the first base station 600 to limit the average transmission power used for transmitting signals to less than the maximum possible average transmission signal power level by limiting the maximum transmission power used for transmitting signals on at least some control channel resources to less than the maximum possible average transmission power level.

In some embodiments the processor 602 is further configured to control the first base station 600 to transmit (e.g., via the output module 608) the first control information on the first set of control channel resources using, on average, at most the fraction of the maximum possible average transmission power level. In some embodiments the processor 602 is configured to control the first base station to transmit the first control information using a first average per control channel resource transmission power level, e.g., an average transmission power used per control channel resource. In various embodiments the control channel resource utilization parameter controls the base station to utilize a first fraction of a full set of available control channel resources in the frame, the first fraction being less than the full set of available control channel resources in the frame. In some such embodiments the processor 602 is configured to control the base station to leave a portion of the available control channel resources in the first frame unused thereby resulting in a lower average transmission power level than if the full set of the available control channel resources were used for transmission at the maximum possible average transmission power. In some embodiments the processor 602 is further configured to control the first base station 600 to transmit (e.g., via the output module 608) data during said first frame using a first average per data channel resource transmission power level, the first average per data channel resource transmission power level being lower than the first average per control channel resource transmission power level by at least an amount determined by a configuration setting, said configuration setting being a power level parameter setting or said control channel resource utilization parameter setting.

In some embodiments the first base station is one of a plurality of physically adjacent base stations and the plurality of physically adjacent base stations are configured to use the same control channel resource utilization setting. In some other embodiments the first base station is one of a plurality of physically adjacent base stations and at least one other base station in the plurality of physically adjacent base stations is configured to use a different control channel resource utilization setting than the first base station. In some embodiments the plurality of physically adjacent base stations are small cells (e.g., femto cells or LTE HeNBs) which are in the coverage area of a macro base station. In some such embodiment the macro base station fully utilizes control channel resources available to the macro base station during a transmission time period of the first frame while the first base station limits the use of its control channel resources, (e.g., by limiting the number of channel resources and/or limiting the average transmission power used for transmitting on the resources to be less than the maximum possible average power).

In various embodiments the processor 602 is further configured to control the base station to receive (via input module 606 receiver) additional interference information and/or control signal(s) from the control entity, determine a new control channel resource utilization parameter setting based on the most recently received interference information received from other base stations or UEs (e.g., updated interference information) or based on control signal(s) received from the control entity, and set the control channel resource utilization parameter based on the new control channel resource utilization parameter setting to limit base station average transmission power used for transmitting signals on control channel resources in a second frame to a second fraction of the maximum possible average transmission power level, the second fraction of the maximum possible average transmission power level being less than the maximum possible average transmission power level.

In some embodiments the processor 602 is further configured to determine a second set of control channel resources to use for transmission of second control information in a second frame based on intended recipients of the second control information and the predetermined resource allocation mapping function which maps intended recipients of the second control information to control channel resources, the number of determined control channel resources used in the second frame being limited to a second fraction of the number of available control channel resources, the second fraction of the number of available control channel resources being determined by the new control channel resource utilization parameter. In some such embodiments the processor 602 is further configured to control the base station to transmit (e.g., via transmitter 624) the second control information on the second set of control channel resources while leaving a portion of the available control channel resources in the second frame unused.

Figure 7:
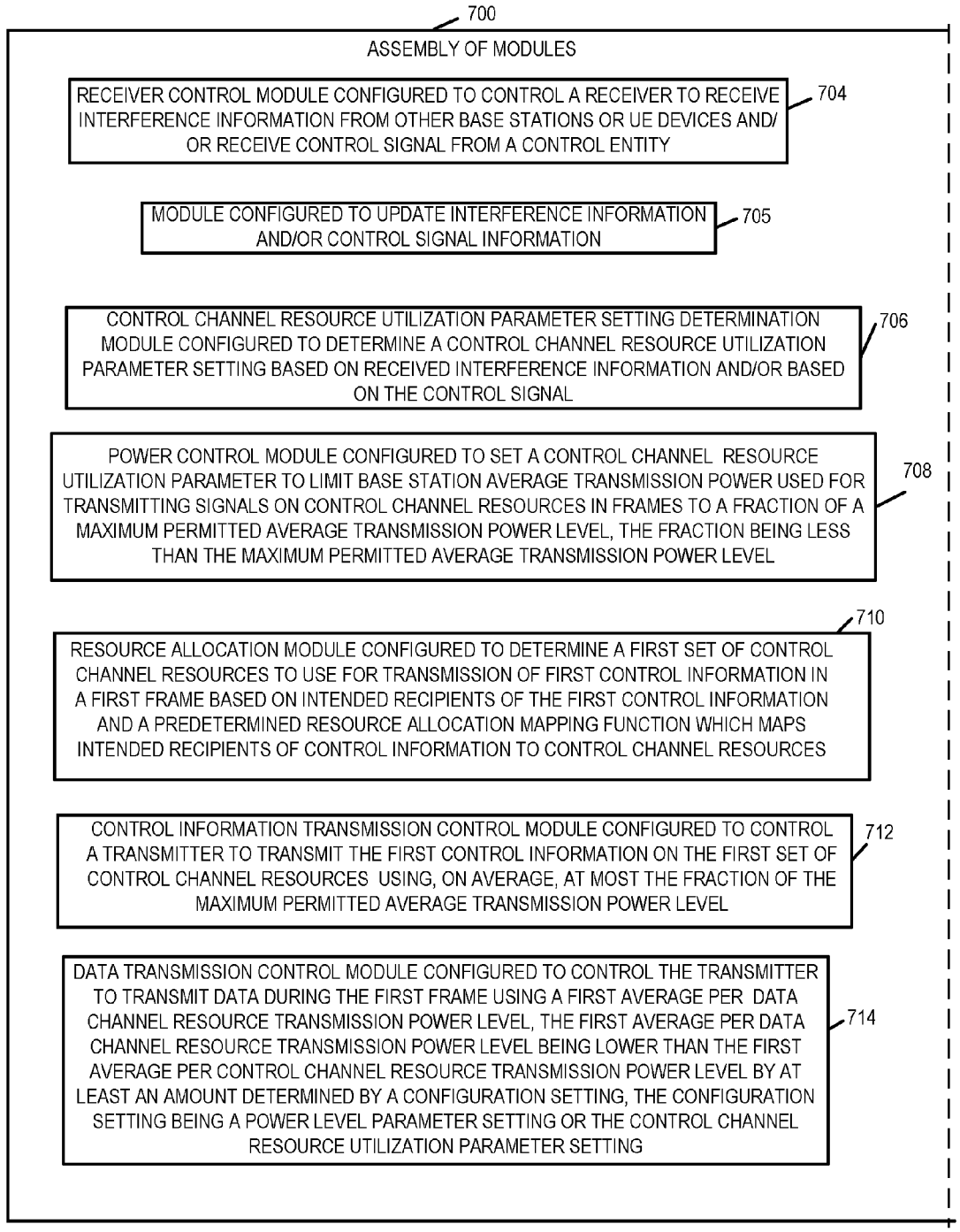
FIG. 7 is a drawing of an assembly of modules which may be included in an exemplary access point, e.g., base station, in accordance with an exemplary embodiment.

FIG. 7, is a drawing of an assembly of modules 700, which may be included in an exemplary access point, e.g., base station, in accordance with an exemplary embodiment. Assembly of modules 700 can, and in some embodiments is, used in the first base station 600. The modules in the assembly of modules 700 can, and in some embodiments are, implemented fully in hardware within the processor 602, e.g., as individual circuits. The modules in the assembly of modules 700 can, and in some embodiments are, implemented fully in hardware within the assembly of modules 610, e.g., as individual circuits corresponding to the different modules. In other embodiments some of the modules are implemented, e.g., as circuits, within the processor 602 with other modules being implemented, e.g., as circuits within assembly of modules 610, external to and coupled to the processor 602. As should be appreciated the level of integration of modules on the processor and/or with some modules being external to the processor may be one of design choice.

Alternatively, rather than being implemented as circuits, all or some of the modules may be implemented in software and stored in the memory 604 of the base station 600, with the modules controlling operation of base station 600 to implement the functions corresponding to the modules when the modules are executed by a processor, e.g., processor 602. In some such embodiments, the assembly of modules 700 is included in the memory 604 as assembly of modules 616. In still other embodiments, various modules in assembly of modules 700 are implemented as a combination of hardware and software, e.g., with another circuit external to the processor providing input to the processor 602 which then under software control operates to perform a portion of a module's function. While shown in the FIG. 6 embodiment as a single processor, e.g., computer, it should be appreciated that the processor 602 may be implemented as one or more processors, e.g., computers.

When implemented in software the modules include code, which when executed by the processor 602, configure the processor 602 to implement the function corresponding to the module. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 7 control and/or configure the access point 600 or elements therein such as the processor 602, to perform the functions of corresponding steps illustrated in the method of flowchart of FIG. 5. Thus the assembly of modules 700 includes various modules that perform functions of corresponding steps of FIG. 5.

Assembly of modules 700 includes a receiver control module 704 configured to control a receiver (e.g., receiver 618 and/or 620) of the base station to receive interference information from one or more devices, e.g., from other base stations or UE devices, or a control signal from a control entity, e.g., a network control node/regional controller, an update module 705 configured to update interference information and/or control signal information, e.g., based on the recently received interference information and/or control signaling. In some embodiments the control entity is a regional controller which receives interference information from multiple base stations.

The assembly of modules 700 further includes a control channel resource utilization parameter setting determination module 706 configured to determine a control channel resource utilization parameter setting based on received interference information received from other base stations or UE devices or based on the control signal received from the control entity, a power control module 708 configured to set a control channel resource utilization parameter (e.g., based on the determined control channel resource utilization parameter setting) to limit base station average transmission power used for transmitting signals on control channel resources in frames to a fraction of a maximum possible average transmission power level, the fraction of the maximum possible average transmission power level being less than the maximum possible average transmission power level, and a resource allocation module 710 configured to determine a first set of control channel resources to use for transmission of first control information in a first frame based on intended recipients of the first control information and a predetermined resource allocation mapping function which maps intended recipients of control information to control channel resources.

In some embodiments the resource allocation module 710 is further configured to determine a number of control channel resources to use to transmit control information to a first recipient, e.g., a first UE device, based on the control channel resource utilization parameter setting and/or an interference level corresponding to the first recipient. In some embodiments the first recipient is one of the intended recipients.

In some embodiments the assembly of modules 700 further includes a control information transmission control module 712 configured to control a transmitter (e.g., transmitter 624 of the first base station 600) to transmit, from the first base station, the first control information on the first set of control channel resources using, on average, at most the fraction of the maximum possible average transmission power level. In some embodiments the control information transmission control module 712 is further configured to control the transmitter to transmit the first control information using a first average per control channel resource transmission power level. In some embodiments the control information transmission control module 712 is further configured to control the transmitter to refrain from using a full set of available control channel resources in the first frame by controlling the transmitter to leave a portion of the available control channel resources in the first frame unused thereby resulting in usage of a lower average transmission power level than if the full set of the control channel resources were used for transmission at the maximum possible average transmission power. In various embodiments the power control module 708 setting the control channel resource utilization parameter and the resource allocation module 710 control the transmission control module 712, e.g., by providing a control input, to perform the transmission control operations in accordance with the control channel resource utilization parameter.

In various embodiments the assembly of modules 700 further includes a data transmission control module 714 configured to control the transmitter to transmit data during the first frame using a first average per data channel resource transmission power level, the first average per data channel resource transmission power level being lower than the first average per control channel resource transmission power level by at least an amount determined by a configuration setting, said configuration setting being a power level parameter setting or said control channel resource utilization parameter setting.

In some embodiments the receiver control module 704 is further configured to control the receiver to receive additional interference information, e.g., from one or more base station or UE devices, and/or control signal from the control entity.

In some embodiments the control channel resource utilization parameter setting determination module 706 is further configured to determine a new control channel resource utilization parameter setting based on interference information, e.g., more recent and/or updated interference information received from other base stations or UEs, or based on additional control signal(s) received from the control entity. In some such embodiments the power control module 708 is further configured to set the control channel resource utilization parameter based on the new control channel resource utilization parameter setting to limit base station average transmission power used for transmitting signals on control channel resources in a second frame to a second fraction of the maximum possible average transmission power level, the second fraction of the maximum possible average transmission power level being less than the maximum possible average transmission power level.

In various embodiments the resource allocation module 710 is further configured to determine a second set of control channel resources to use for transmission of second control information in the second frame based on intended recipients of the second control information and the predetermined resource allocation mapping function which maps intended recipients of the second control information to control channel resources, the number of determined control channel resources used in the second frame being limited to a second fraction of the number of available control channel resources, said second fraction being determined by the new control channel resource utilization parameter. In some such embodiments the control information transmission control module 712 is further configured to transmit the second control information on the second set of control channel resources while leaving a portion of the available control channel resources in the second frame unused.

The techniques of various embodiments may be implemented using software, hardware and/or a combination of software and hardware. Various embodiments are directed to apparatus, e.g., communications device such as base station, access point, e.g., an HeNB, home gateway, and/or a user equipment (UE) device, etc. Various embodiments are directed to communications systems. Various embodiments are also directed to methods, e.g., a method of operating and/or controlling a communications device such as a base station/access point, e.g., small cell or an LTE HeNB, and/or a user equipment (UE) device, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium. It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, setting, determining, signal generation, signal transmission, signal reception, signal processing, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a base station, including a processor configured to implement one, multiple or all of the steps of one or more methods of the invention.

In some embodiments, the processor or processors, e.g., CPUs, of one or more devices, e.g., of the communications device, e.g., a base station, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device with a processor which includes a module corresponding to each of the steps of the various described methods performed by the device in which the processor is included. In some but not all embodiments an apparatus, e.g., a communications device includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Various features are directed to a system including multiple network nodes or components including, for example, one or more servers and one or more access points, e.g., base stations and/or other network nodes or entities. In various embodiments the nodes or entities are implemented as hardware, e.g., separate devices each including a communications interface for sending and/or receiving signals communicating data or other information, one or more processors and memory. In some embodiments the memory includes data and/or control routines. In at least some embodiments the one or more processors operate under control instructions in the control routine or routines stored in the node's memory. Thus, when executed by the processor, the instructions control the node or other network entity to perform the functions in accordance with one or more of the methods described herein. In some embodiments the processor or processors of individual nodes are special purposed processors, e.g., ASICs, with hardware circuitry which is configured to implement or control the node or network entity in which the special purpose processor is located to implement one or more steps in accordance with a method or methods described herein. In at least some embodiments, circuits and/or other hardware are used to implement the node or method resulting in a fully hardware implemented embodiment.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
setting, at a first base station, a control channel resource utilization parameter to limit base station average transmission power used for transmitting signals on control channel resources in frames to a fraction of a maximum possible average transmission power level, said fraction being less than the maximum possible average transmission power level;
determining, at the first base station, a first set of control channel resources to use for transmission of first control information in a first frame based on intended recipients of the first control information and a predetermined resource allocation mapping function which maps intended recipients of control information to control channel resources; and
transmitting, from the first base station, the first control information on the first set of control channel resources using, on average, at most said fraction of the maximum possible average transmission power level.

2. The method of claim 1, wherein said control channel resource utilization parameter controls said first base station to limit the average transmission power used for transmitting signals to less than the maximum possible average transmission signal power level by limiting the maximum transmission power used for transmitting signals on at least some control channel resources to less than the maximum possible average transmission power level.

3. The method of claim 1, wherein said control channel resource utilization parameter controls said first base station to utilize a first fraction of a full set of available control channel resources in said first frame, said first fraction being less than the full set of available control channel resources in said first frame; and
wherein transmitting, from the first base station, the first control information on the first set of control channel resources using, on average, at most said fraction of the maximum possible average transmission power level includes leaving a portion of the available control channel resources in the first frame unused thereby resulting in a lower average transmission power level than if the full set of control channel resources were used for transmission at the maximum possible average transmission power level.

4. The method of claim 3, further comprising:
determining a new control channel resource utilization parameter setting based on interference information received from other base stations or UEs or based on a control signal received from a control entity.

5. The method of claim 4, further comprising:
determining a second set of control channel resources to use for transmission of second control information in a second frame based on intended recipients of the second control information and the predetermined resource allocation mapping function which maps intended recipients of the second control information to control channel resources, the number of determined control channel resources used in the second frame being limited to a second fraction of the number of available control channel resources, said second fraction of the number of available control channel resources being determined by the new control channel resource utilization parameter; and
transmitting the second control information on the second set of control channel resources while leaving a portion of the available control channel resources in the second frame unused.

6. The method of claim 1, further comprising:
wherein said transmission of the first control information is performed using a first average per control channel resource transmission power level; and
transmitting data during said first frame using a first average per data channel resource transmission power level, the first average per data channel resource transmission power level being lower than the first average per control channel resource transmission power level by at least an amount determined by a configuration setting, said configuration setting being a power level parameter setting or said control channel resource utilization parameter setting.

7. The method of claim 1, wherein the intended recipients include a first recipient, the method further comprising:
determining a number of control channel resources to use to transmit control information to the first recipient based on the control channel resource utilization parameter setting and an interference level corresponding to the first recipient.

8. The method of claim 1,
wherein said first base station is one of a plurality of physically adjacent base stations and wherein said plurality of physically adjacent base stations are configured to use the same control channel resource utilization setting; and
wherein said first base station is synchronized to a sub-frame level with a second base station, said second base station being one of the plurality of physically adjacent base stations, said second base station using a sub-frame timing structure which has a control portion which does not overlap a control portion of a sub-frame timing structure used by the first base station, said first base station having a frame structure having data portions which overlap control portions of the frame structure of the second base station, said second base station having a frame structure having data portions which overlap control portions of the frame structure of the first base station, said first base station maintaining timing synchronization with said second base station.

9. The method of claim 8, wherein said plurality of physically adjacent base stations are small cells which are in the coverage area of a macro base station, the method further comprising:
operating the macro base station to fully utilize control channel resources available to the macro base station during a transmission time period of said first frame.

10. The method of claim 1, wherein said first base station is one of a plurality of physically adjacent base stations and at least one other base station in said plurality of physically adjacent base stations is configured to use a different control channel resource utilization setting than the first base station.

11. The method of claim 10, wherein said plurality of physically adjacent base stations are small cells which are in the coverage area of a macro base station, the method further comprising:
operating the macro base station to fully utilize control channel resources available to the macro base station during a transmission time period of said first frame.

12. A base station, comprising:
a power control module configured to set a control channel resource utilization parameter to limit base station average transmission power used for transmitting signals on control channel resources in frames to a fraction of a maximum possible average transmission power level, said fraction being less than the maximum possible average transmission power level;
a control channel resource allocation module configured to determine a first set of control channel resources to use for transmission of first control information in a first frame based on intended recipients of the first control information and a predetermined resource allocation mapping function which maps intended recipients of control information to control channel resources; and
a transmitter configured to transmit, from the base station, the first control information on the first set of control channel resources using, on average, at most said fraction of the maximum possible average transmission power level.

13. The base station of claim 12, wherein said control channel resource utilization parameter controls said base station to limit the average transmission power used for transmitting signals to less than the maximum possible average transmission signal power level by limiting the maximum transmission power used for transmitting signals on at least some control channel resources to less than the maximum possible average transmission power level.

14. The base station of claim 12, wherein said control channel resource utilization parameter controls said base station to utilize a first fraction of a full set of available control channel resources in said first frame, said first fraction being less than the full set of available control channel resources in said first frame; and
wherein said base station further includes a control information transmission control module configured to control said transmitter to leave a portion of the available control channel resources in the first frame unused thereby resulting in a lower average transmission power level than if the full set of control channel resources were used for transmission at the maximum possible average transmission power level.

15. The base station of claim 14, further comprising:
a control channel resource utilization parameter setting determination module configured to determine a new control channel resource utilization parameter setting based on interference information received from other base stations or UEs or based on a control signal received from a control entity.

16. The base station of claim 15,
wherein said control channel resource allocation module is further configured to determine a second set of control channel resources to use for transmission of second control information in a second frame based on intended recipients of the second control information and the predetermined resource allocation mapping function which maps intended recipients of the second control information to control channel resources, the number of determined control channel resources used in the second frame being limited to a second fraction of the number of available control channel resources, said second fraction of the number of available control channel resources being determined by the new control channel resource utilization parameter; and
wherein said control information transmission control module is further configured to control said transmitter to transmit the second control information on the second set of control channel resources while leaving a portion of the available control channel resources in the second frame unused.

17. The base station of claim 12, further comprising:
wherein said transmitter uses a first average per control channel resource transmission power level to transmit the first control information; and
wherein said transmitter is further configured to transmit data during said first frame using a first average per data channel resource transmission power level, the first average per data channel resource transmission power level being lower than the first average per control channel resource transmission power level by at least an amount determined by a configuration setting, said configuration setting being a power level parameter setting or said control channel resource utilization parameter setting.

18. The base station of claim 12, wherein the intended recipients include a first recipient; and
wherein said control channel resource allocation module is further configured to determine a number of control channel resources to use to transmit control information to the first recipient based on the control channel resource utilization parameter setting and an interference level corresponding to the first recipient.

19. The base station of claim 12, wherein said base station is one of a plurality of physically adjacent base stations and wherein said plurality of physically adjacent base stations are configured to use the same control channel resource utilization setting.

20. A non-transitory machine readable medium including processor executable instructions, which when executed by a processor of a first base station controls said first base station to:
set, at the first base station, a control channel resource utilization parameter to limit base station average transmission power used for transmitting signals on control channel resources in frames to a fraction of a maximum possible average transmission power level, said fraction being less than the maximum possible average transmission power level;
determine, at the first base station, a first set of control channel resources to use for transmission of first control information in a first frame based on intended recipients of the first control information and a predetermined resource allocation mapping function which maps intended recipients of control information to control channel resources; and
transmit, from the first base station, the first control information on the first set of control channel resources using, on average, at most said fraction of the maximum possible average transmission power level.

* * * * *